United States Patent
Miyoshi et al.

(10) Patent No.: US 6,477,213 B1
(45) Date of Patent: Nov. 5, 2002

(54) BASE STATION APPARATUS AND RADIO COMMUNICATION METHOD

(75) Inventors: Kenichi Miyoshi, Yokohama (JP); Katsuhiko Hiramatsu, Yokosuka (JP); Ryusuke Kiryu, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/317,614

(22) Filed: May 25, 1999

(30) Foreign Application Priority Data

May 28, 1998 (JP) ............................. 10-147599

(51) Int. Cl.⁷ .............................. H04B 7/10; H04B 1/18
(52) U.S. Cl. ..................................... 375/347; 455/277.1
(58) Field of Search ............................... 375/347, 351, 375/349, 345, 316, 148; 455/277.1, 277.2, 278.1, 279, 304, 67.1, 561, 562, 63

(56) References Cited

U.S. PATENT DOCUMENTS 6,222,498 B1 * 4/2001 Ishii et al. ................... 343/853
6,243,412 B1 * 6/2001 Fukawa ........................ 375/219
6,314,271 B1 * 11/2001 Kitayoshi ................... 342/378

FOREIGN PATENT DOCUMENTS

| JP | 6-252810 | 9/1994 |
|---|---|---|
| JP | 7-297733 | 11/1995 |

OTHER PUBLICATIONS

English language abstract of JP 6-252810.
English language abstract of JP 7-297733.
"Waveform Equalization Technology for Digital Mobile Communications", p. 103, line 1 to p. 104, line 22, published by Triceps Corp., compiled under the supervision of Jun Horigoshi, Jun. 1, 1996.

* cited by examiner

Primary Examiner—Chi Pham
Assistant Examiner—Khai Tran
(74) Attorney, Agent, or Firm—Greenblum & Bernstein, P.L.C.

(57) ABSTRACT

Antenna received signals 101-1 to 101-n are input to weighting coefficient calculation section 103. Weighting coefficient calculation section 103 determines weighting coefficients so as to eliminate interference using antenna received signals 101-1 to 101-n and known signal and combines them into weighted/combined signal 107. Envelope variation detection section 116 detects variations in the envelope of the weighted/combined signal. Interference mixing time detection section 108 detects the interference mixing time from the output of envelope variation detection section 116. Envelope variation detection sections 117 to 119 detect envelope variations of the received signals. Combination system control section 113 switches switch section 114 so that the received signal with the least envelope variation may be output at the interference mixing time.

24 Claims, 13 Drawing Sheets

COMBINED SIGNAL CONSTELLATION WITH
NO ASYNCHRONOUS INTERFERENCE

COMBINED SIGNAL CONSTELLATION WITH
ASYNCHRONOUS INTERFERENCE

COMBINED SIGNAL CONSTELLATION
WITH NO INTERFERENCE

POST-DELAY-DETECTION SIGNAL
CONSTELLATION WITH INTERFERENCE

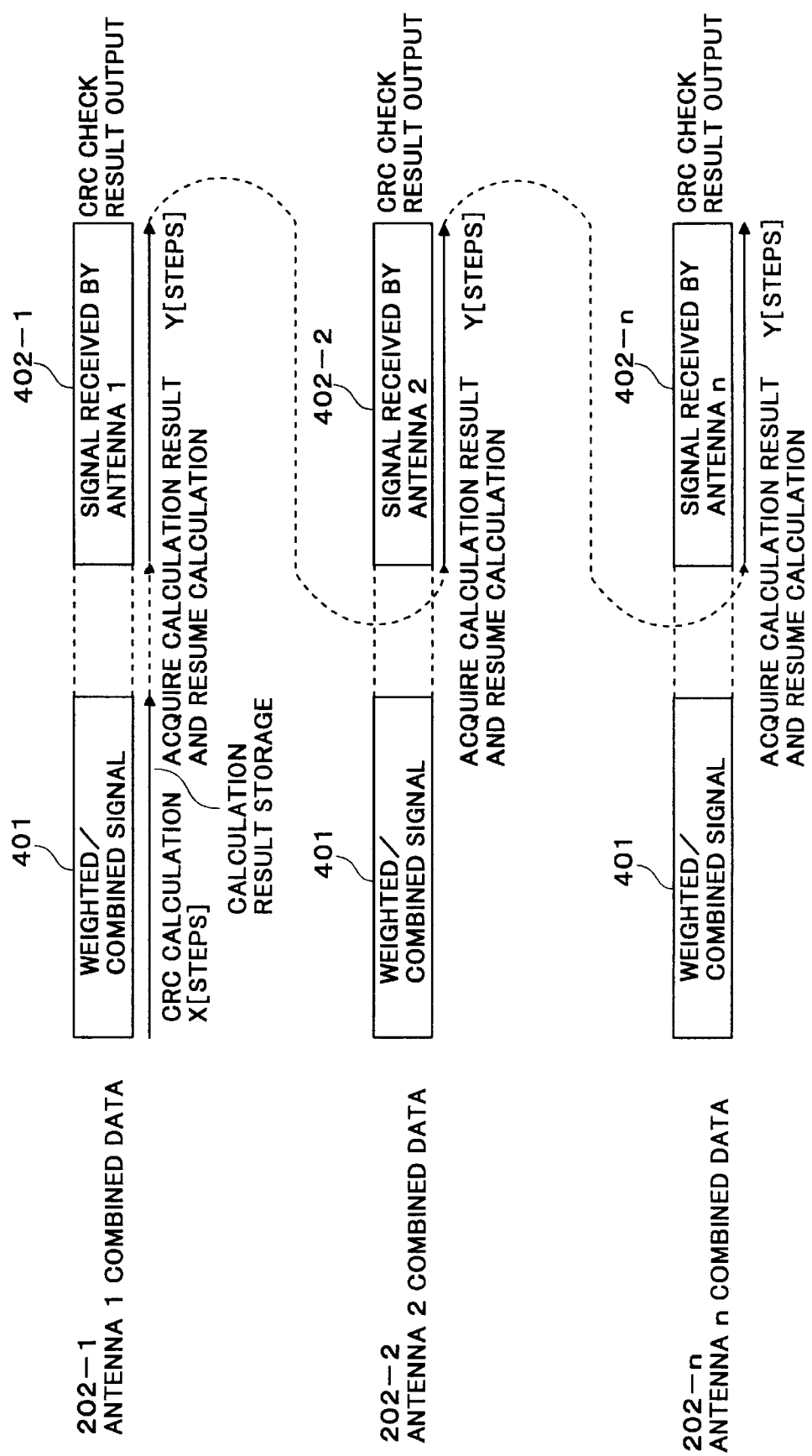

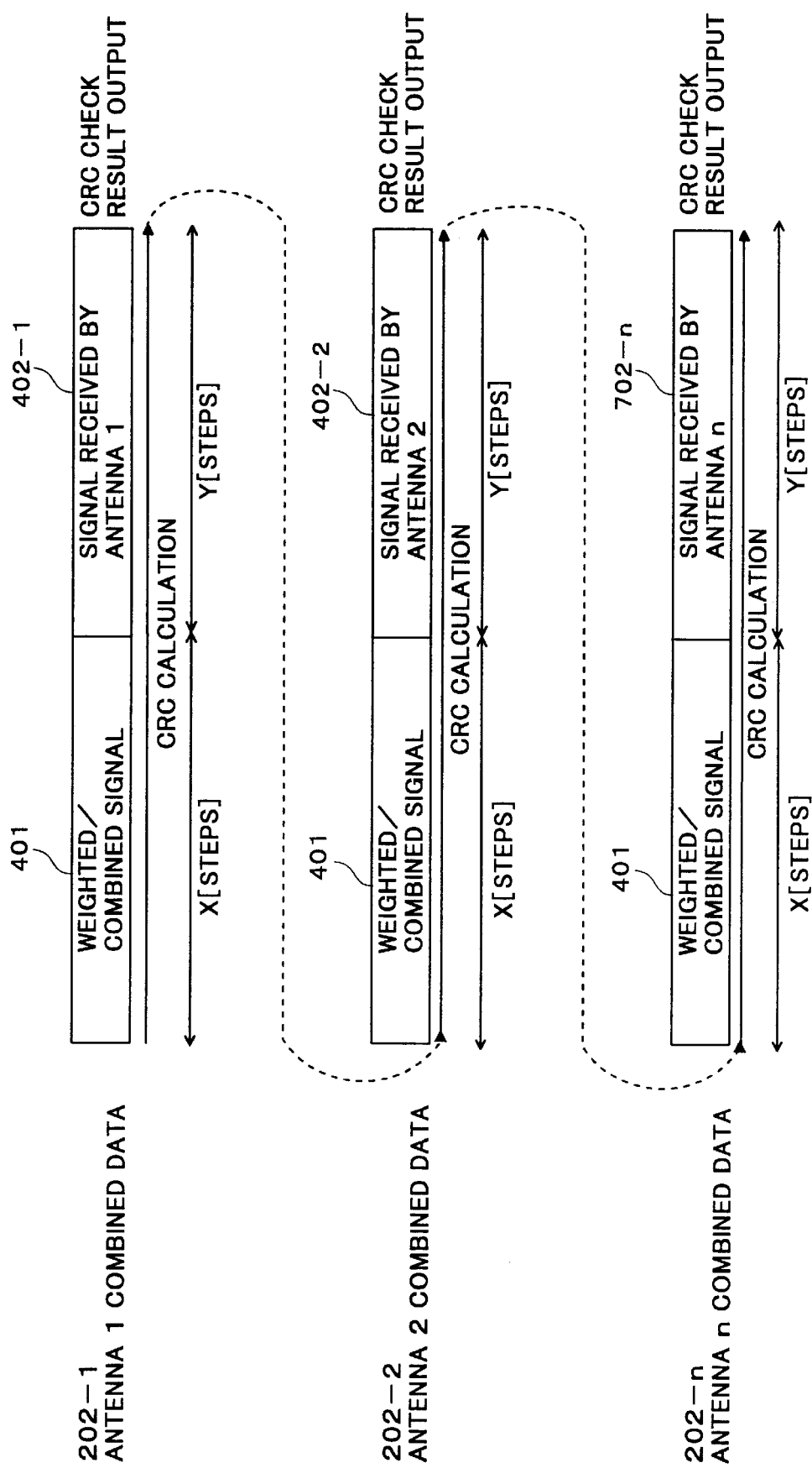

BASE STATION APPARATUS AND RADIO COMMUNICATION METHOD

BACKGROUND OF THE INVENTION

1. Field of the Invention

The present invention relates to base station apparatuses and radio communication methods used in digital radio communication systems.

2. Description of the Related Art

A reception method using adaptive array antennas is known as the reception method by which signals received by a plurality of antenna elements are weighted/combined. The "Waveform Equalization Technology for Digital Mobile Communications" (compiled under the supervision of Jun Horigoshi, Triceps Co, Ltd.) describes that using an array antenna made up of a plurality of antennas to combine the antenna outputs after adding amplitudes and phase shifts changes array directivity. The adaptive array uses this principle. More specifically, it determines a weighting coefficient for each antenna output based on a certain control algorithm and controls directivity by adapting itself to changes in surrounding conditions.

FIG. 1 is a block diagram showing the configuration of the adaptive array reception apparatus above (hereinafter referred to as "reception adaptive array"). As shown in FIG. 1, outputs 2 of a plurality of antennas 1 are multiplied by weighting coefficients 3, and these antenna outputs are combined by adder 7 into array output 4. The weighting coefficient corresponding to each antenna output is controlled by weighting coefficient control section 5. Weighting coefficient control section 5 controls weighting coefficients using three kinds of information, array output 4, antenna outputs 2 and preliminary knowledge 6 concerning a desired signal. There is also another method without using array output 4 for weighting coefficient control.

Conventionally, a weighting coefficient control algorithm assuming synchronous interference is used for control by weighting coefficient control section 5. According to this algorithm, it is only when an interference signal exists in the known signal portion of a desired wave that it is possible to determine such a weighting coefficient that will eliminate the interference signal.

However, in such a case where a desired signal transmitted by a communication user is mixed with an interference signal provided by another communication user, synchronization between the desired signal and interference signal is not guaranteed. This results, for example, in an interference signal mixing amidst the desired signal as shown in FIG. 4.

In FIG. 4, the interference signal starts to intrude amidst the desired signal at an interference mixing time, interfering with message section 302, but not with known signal section 301. Thus, when the interference signal intrudes amidst the desired signal, the reception adaptive array calculates weighting coefficients using known signal 301 free of the interference signal, and therefore it is not possible to remove the interference signal in the message section. This results in a problem that interference deteriorates the reception performance, increasing errors.

SUMMARY OF THE INVENTION

It is an objective of the present invention to provide a base station apparatus and radio communication method capable of improving the reception performance and reducing errors even if an interference signal intrudes amidst a desired signal.

This objective is achieved using a base station apparatus which adaptively controls a combination system according to the time (timing) at which the interference signal starts to mix with the desired signal.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 15 is a drawing to explain operations of the error detection section of the base station apparatus according to Embodiment 5 of the present invention; and FIG. 16 is a drawing to explain operations of the error detection section of the base station apparatus according to the above embodiment.

DETAILED DESCRIPTION OF THE PREFERRED EMBODIMENTS (Embodiment 1)

Figure 1:
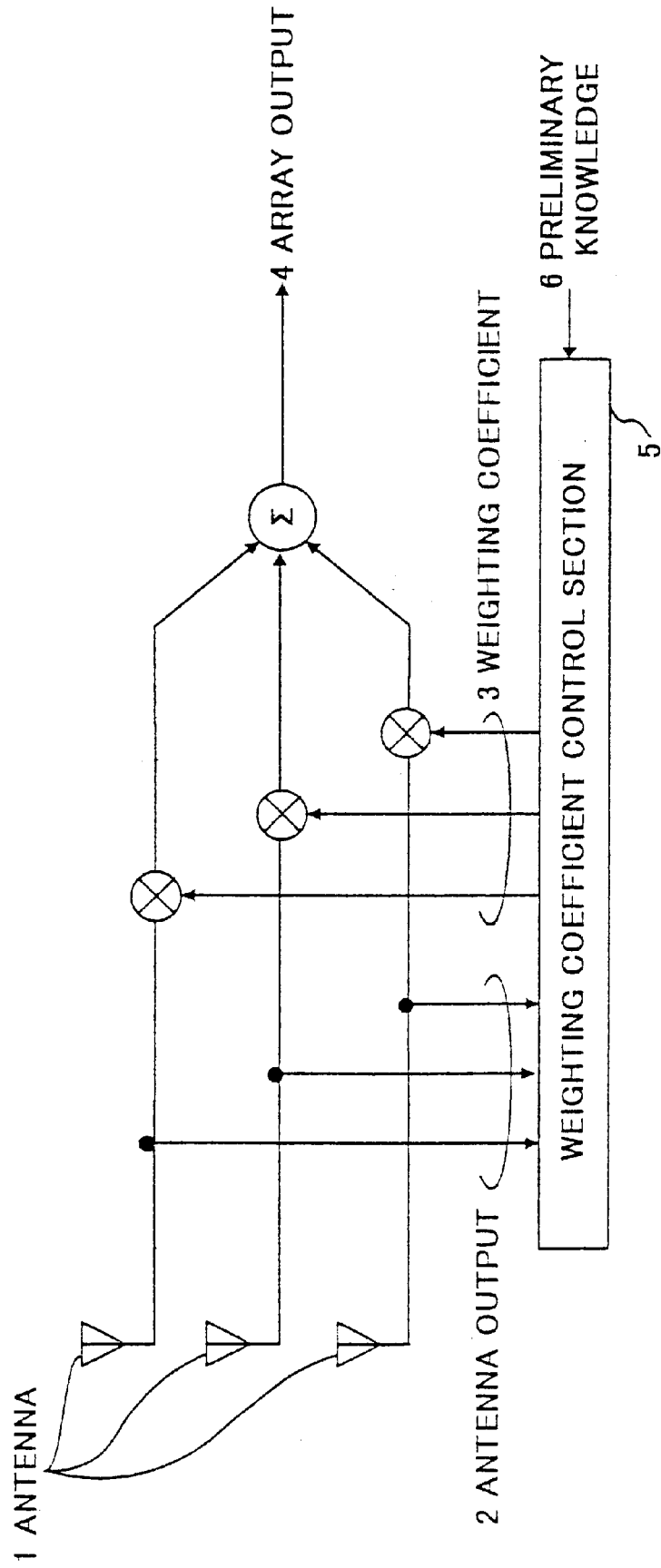
FIG. 1 is a block diagram showing the configuration of a conventional reception adaptive array.
Figure 2:
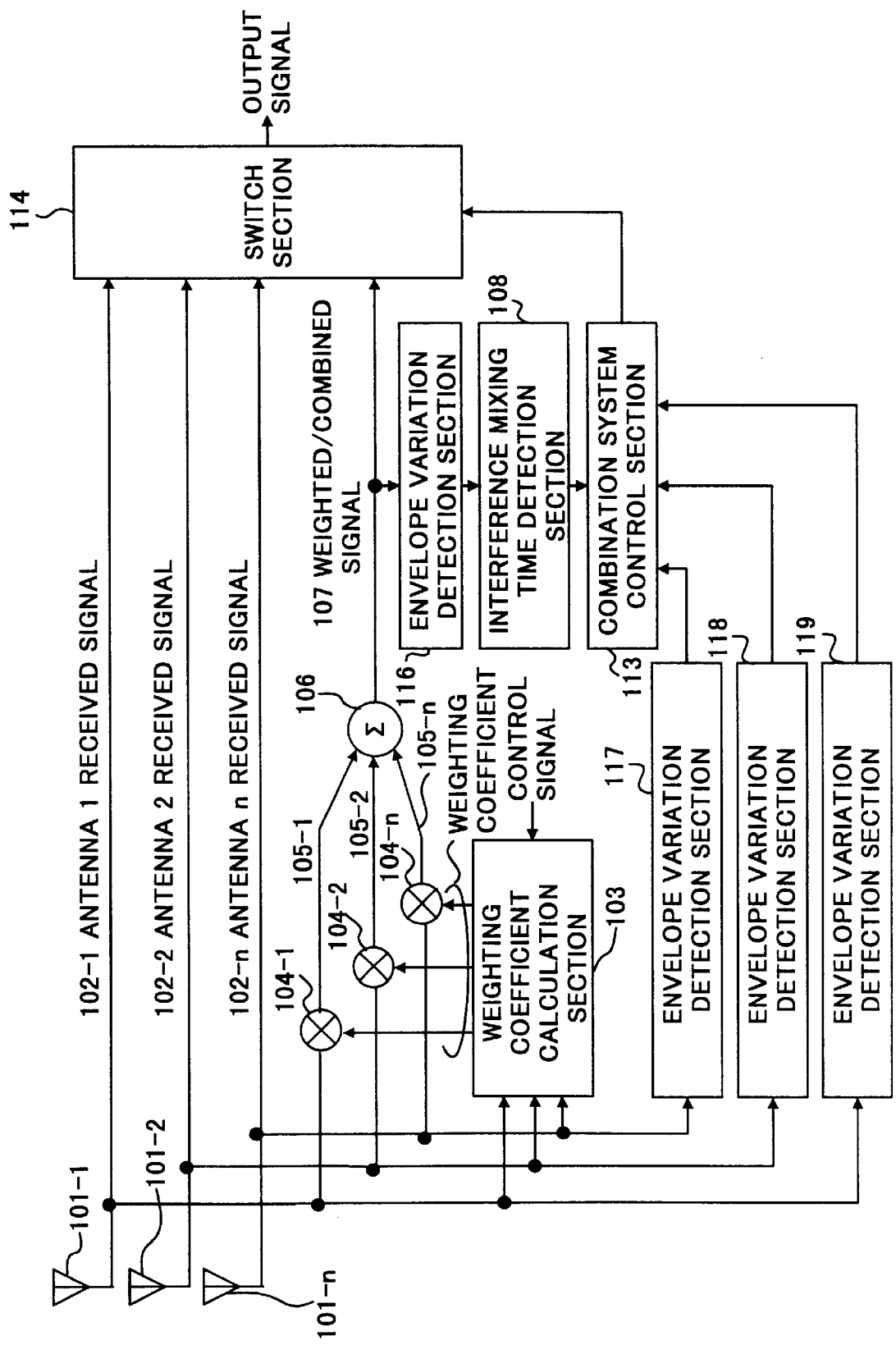
FIG. 2 is a block diagram showing the configuration of a base station apparatus according to Embodiment 1 of the present invention.

FIG. 2 is a block diagram showing the configuration of a base station apparatus according to Embodiment 1 of the present invention. This base station apparatus inputs signals received from a plurality of antenna elements 101-1 to 101-n to their corresponding multipliers 104-1 to 104-n and multiplies these received signals by their respective weighting coefficients. Multiplier outputs 105-1 to 105-n are combined by adder 106 into weighted/combined signal 107. These weighting coefficients are calculated by weighting coefficient calculation section 103 from a known signal of the desired signal and received signals 102-1 to 102-n.

Envelope variation detection section 116 detects envelope variations of weighted/combined signal 107. Interference mixing time detection section 108 detects the time (timing) at which interference mixes with received signals 102-1 to 102-n from the output of envelope variation detection section 116. According to the output of interference mixing time detection section 108, combination system control section 113 controls switch section 114 to output either weighted/combined signal 107 or received signals 102-1 to 102-n.

Then, the operation of the base station apparatus with such a configuration is explained in detail below. Signals received through antenna elements 101-1 to 101-n are input to weighting coefficient calculation section 103. Using antenna received signals 102-1 to 102-n and a known desired signal, weighting coefficient calculation section 103 calculates such weighting coefficients that will remove interference signals.

Figure 4:
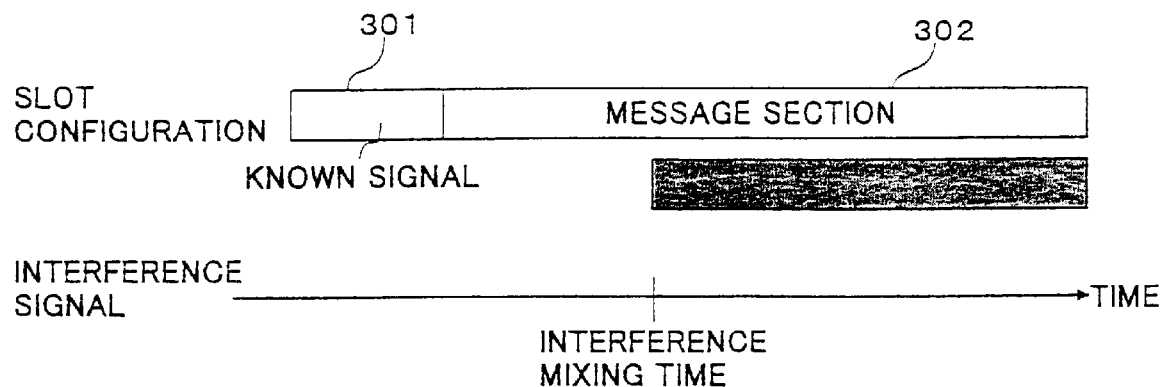
FIG. 4 is a drawing to explain asynchronous interference and interference mixing time in the above embodiment.

For asynchronous interference as shown in FIG. 4, known signal section 301 of the received signal contains no interference, and therefore the weighting coefficient calculated at that part is not the one that can eliminate the interference signal in message section 302, which causes the reception quality to deteriorate from the time at which interference is mixed, increasing errors. To handle asynchronous interference, in the present embodiment, interference mixing time detection section 108 detects the interference mixing time from variations in the envelope of weighted/combined signal 107.

Then, the operation that makes it possible to detect interference through envelope variations is explained below. In the case where the received signal is a signal modulated according to a modulation system such as $\pi/4$ shift QPSK modulation system, the signal is modulated in such a way that its envelope is constant at identification points. Therefore, if there is no mixture of interference and the fading pitch is long enough with respect to the length of the reception slot, there should be virtually no envelope variations in the reception slot. However, if interference is mixed with the received signal, the envelope of the received signal is not constant, and starts to change from the time at which interference is mixed. The interference mixing time detection section in the present embodiment detects this envelope variation and detects the time at which interference is mixed.

Then, combination system control section 113 controls switch section 114 so that weighted/combined signal 107 may be output as an output signal before the time at which interference is mixed, and the received signal with the least interference from among received signals 102-1 to 102-n may be output as an output signal after the interference mixing time.

Below is an explanation of the procedure for selecting the signal with the least interference, or the antenna least affected by an interference signal from among received signals 102-1 to 102-n. When installing antennas, a plurality of antennas 101-1 to 101-n are located in such a way that fading correlation approximates to 0. This makes fading of interference waves at different antennas independent of one another.

Thus, even if an interference wave is mixed at an antenna, the level of the interference wave may be very small at another antenna due to fading. In such a case, it is possible to reduce the influence of interference mixing by selecting an antenna which receives signals containing a higher level of the desired wave and lower level of interference.

The following is the procedure for selecting an antenna less affected by interference waves based on envelope variations of the received signal. Envelope variation detection sections 117 to 119 detect envelope variations in received signals 101-1 to 101-n, respectively. As shown above, for the signal modulated according to a modulation system whose envelope is fixed when there is no interference, the envelope starts to change from the time at which the interference is mixed.

Thus, combination system control section 113 treats the signal received from the antenna with the least envelope variation in the reception slot as the one with the least interference and controls switch section 114 to output it. This method facilitates detection of the interference signal mixing timing by only monitoring envelope variations of the combined signal.

The present embodiment only explains the case of delay detection according to the $\pi/4$ shift QPSK modulation system, but any other modulation systems that keep the envelope constant can detect the size of interference mixing in the same way. Even in the case of asynchronous interference mixing, the above operation allows received signals with less interference to be output in the area of interference mixing, improving both the reception performance and error rate characteristic.

The present embodiment has a configuration in which the combination system control section controls switch section 114 to select only one received signal to be output, but it is also possible for the combination system control section to control the weighting coefficient calculation section so that weighted/combined signal 107 may only be output from an antenna with less interference. Similar effects can be obtained in this case as well, in which case switch section 114 is not necessary and reception is possible with only one branch.

The present embodiment also has a configuration in which the combination system control section controls switch section 114 to select only one received signal to be output, but it is also possible to achieve similar effects by the combination system control section controlling the weighting coefficient calculation section so that combination may be performed using only antennas with less interference, in which case switch section 114 is not necessary and it is also possible to obtain diversity gain by receiving signals through a plurality of antennas.

(Embodiment 2)

Figure 3:
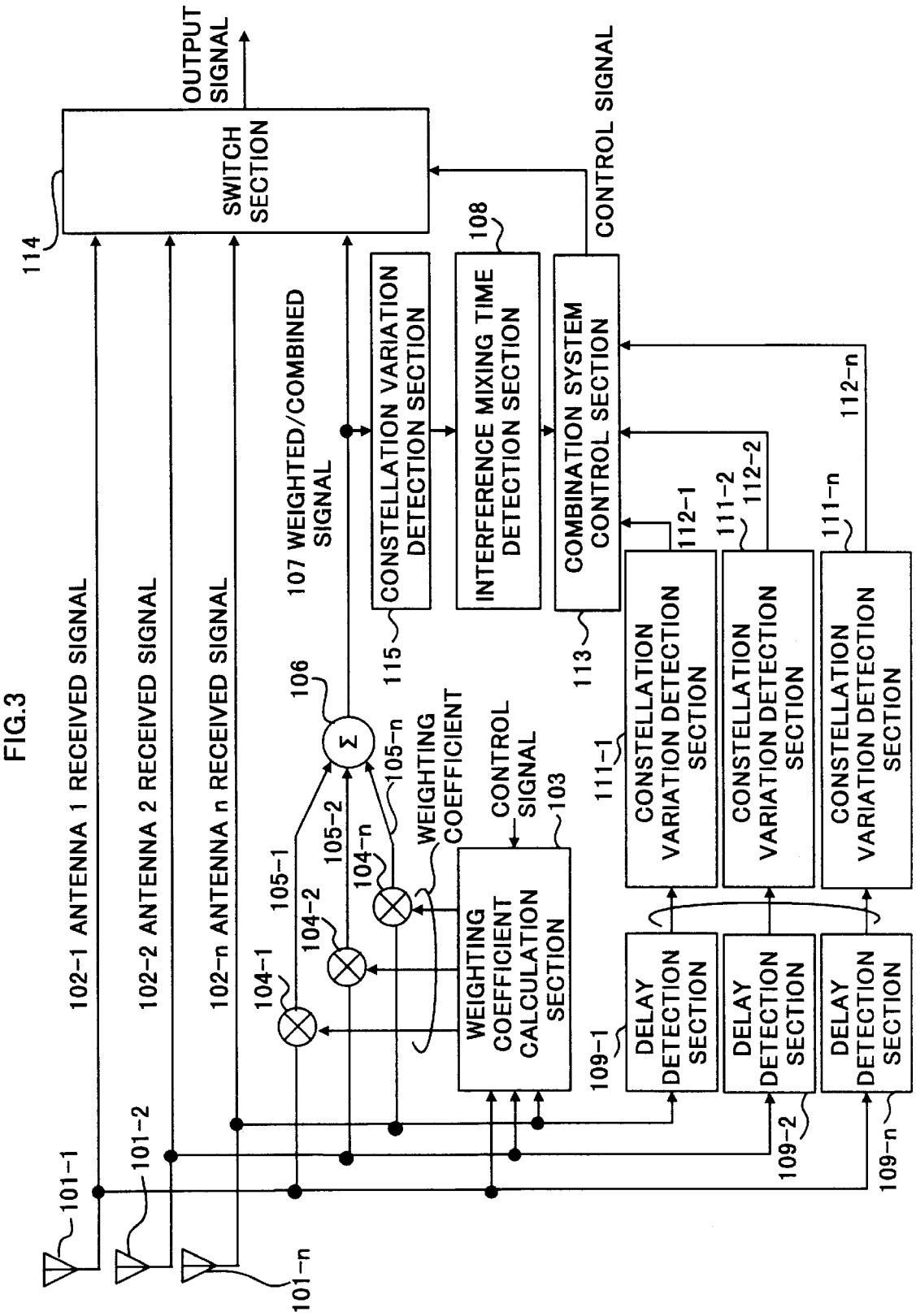
FIG. 3 is a block diagram showing the configuration of a base station apparatus according to Embodiment 2 of the present invention.

FIG. 3 is a block diagram showing the configuration of a base station apparatus according to Embodiment 2 of the present invention. This base station apparatus inputs the received signals output from a plurality of antenna elements 101-1 to 101-n to their respective multipliers 104-1 to 104-n and multiplies these received signals by weighting coefficients.

Then, adder 106 combines multiplier outputs 105-1 to 105-n and obtains weighted/combined signal 107. These weighting coefficients are calculated by weighting coefficient calculation section 103 from a known signal of the desired signal and received signals 102-1 to 102-n. Constellation variation detection section 115 detects constellation variations of weighted/combined signal 107. Interference mixing time detection section 108 detects the time (timing) at which interference is mixed with received signals 102-1 to 102-n from the output of constellation variation detection section 115.

Delay detection sections 109-1 to 109-n perform delay-detection of received signals 102-1 to 102-n, respectively and output post-delay-detection signal 110. Constellation variation detection sections 111-1 to 111-n detect constellation variations of post-delay-detection signal 110 on the IQ plane. Combination system control section 113 controls switch section 114 from the output of interference mixing time detection section 108 so that either weighted/combined signal 107 or received signals 102-1 to 102-n may be output.

Then, the operation of the base station apparatus with such a configuration is explained in detail below. Signals received through antenna elements 101-1 to 101-n are input to weighting coefficient calculation section 103. Using antenna received signals 102-1 to 102-n and a known signal of the desired signal, weighting coefficient calculation section 103 calculates such weighting coefficients that will remove any interference signal.

For asynchronous interference as shown in FIG. 4, known signal section 301 of the received signal contains no interference, and therefore the weighting coefficient calculated at that part is not the one that can eliminate the interference signal in message section 302, which causes the reception quality to start to deteriorate from the time at which interference is mixed, increasing errors. To handle asynchronous interference in the present embodiment, the interference mixing time detection section detects the interference mixing time from variations in the constellation of weighted/combined signal 107.

Figure 5:
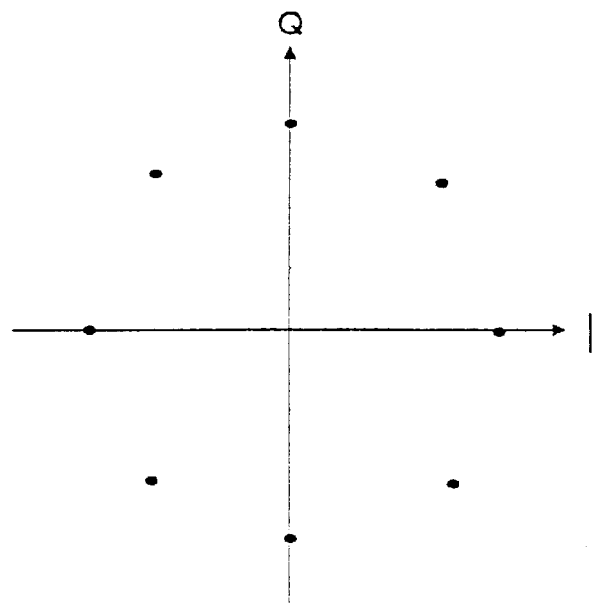
FIG. 5 is a drawing to explain the constellation of a weighted/combined signal with no interference in the above embodiment.
Figure 6:
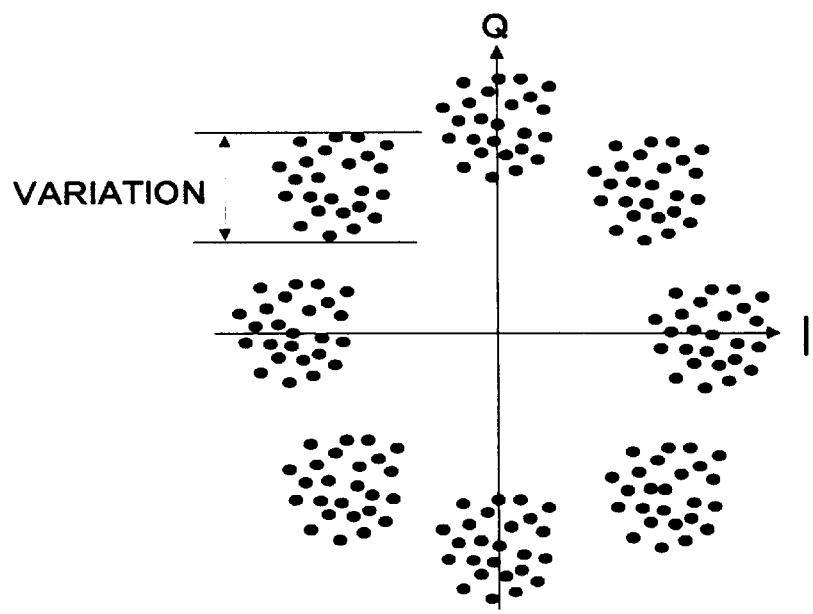
FIG. 6 is a drawing to explain the constellation of a weighted/combined signal with interference in the above embodiment.

This interference mixing time detection is explained using FIG. 5 and FIG. 6. FIG. 5 is an explanatory drawing of the constellation of a weighted/combined signal with no interference. This drawing shows an example of the π/4 shift QPSK modulation system. As seen from FIG. 5, the constellation is concentrated on 8 points.

FIG. 6 is an explanatory drawing of the constellation of a weighted/combined signal with interference mixing. Like FIG. 5, this drawing shows an example of the π/4 shift QPSK modulation system. As seen from FIG. 6, the constellation is not concentrated on 8 points, but shows variations. Interference mixing time detection section 108 detects the time at which asynchronous interference is mixed by detecting these constellation variations.

The present embodiment only explains an example of the π/4 shift QPSK modulation system, but any other modulation systems can also detect the interference mixing time in the same way. Then, combination system control section 113 controls switch section 114 to output combined signal 107 as the output signal before the interference mixing time, and the received signal with the least interference of received signals 102-1 to 102-n as the output signal after the interference mixing time.

Below is an explanation of the procedure for selecting the received signal with the least interference from among received signals 102-1 to 102-n. When installing antennas, a plurality of antennas 101-1 to 101-n are located in such away that fading correlation approximates to 0. This makes fading of interference waves at different antennas independent of one another. Thus, even if an interference wave is mixed at an antenna, the level of the interference wave may be very small at another antenna due to fading. In such a case, it is possible to reduce the influence of interference mixing by selecting an antenna receiving signals containing a higher level of the desired wave and lower level of interference.

The following is the procedure for selecting an antenna less affected by interference waves using the constellation of a post-delay-detection signal. Delay detection sections 109-1 to 109-n perform delay detection of received signals 101-1 to 101-n, respectively and outputs post-delay-detection signal 110. The constellation variation detection section detects constellation variations of post-delay-detection signal n of each antenna from the output of post-delay-detection signal 110.

Figure 7:
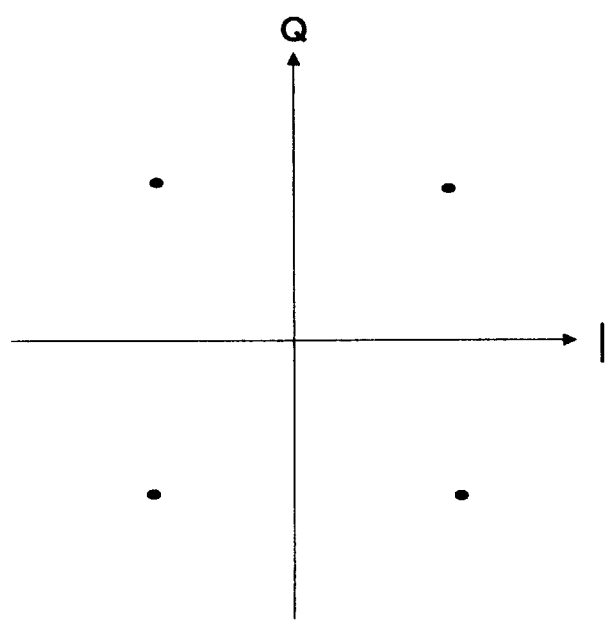
FIG. 7 is a drawing to explain the constellation of a received signal after delay detection with no interference in the above embodiment.
Figure 8:
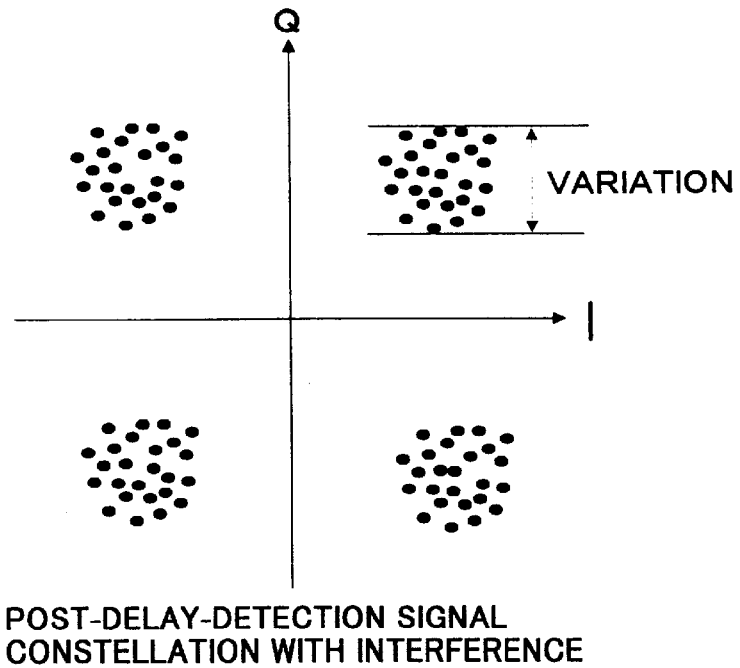
FIG. 8 is a drawing to explain the constellation of a received signal after delay detection with interference in the above embodiment.

These constellation variations are explained using FIG. 7 and FIG. 8. FIG. 7 is a drawing to explain the constellation of the post-delay-detection signal in the case of no interference mixing. This drawing shows an example of the π/4 shift QPSK modulation system. As seen from FIG. 7, the constellation is concentrated on 4 points.

FIG. 8 is a drawing to explain the constellation of the post-delay-detection signal in the case of interference mixing. This drawing also shows an example of the π/4 shift QPSK modulation system. As seen from FIG. 8, the constellation is not concentrated on 4 points, but there are variations.

The less the interference, the smaller the constellation variation. The greater the interference, the greater the constellation variation. Thus, combination system control section 113 can detect which antenna receives the signal with interference by detecting constellation variations of this post-delay-detection signal. This method can not only monitor constellation variations of the combined signal but also easily detect the mixing timing of the interference signal.

The present embodiment only explains the case of delay detection according to the π/4 shift QPSK modulation system, but any other modulation systems can detect the extent of interference mixing in the same way.

Even in the case of asynchronous interference mixing, the above operation allows received signals with less interference to be output in the area of interference, improving both the reception performance and error rate characteristic.

The present embodiment has a configuration in which the combination system control section controls switch section 114 to select only one received signal to be output, but it is also possible for the combination system control section to control the weighting coefficient calculation section so that weighted/combined signal 107 may be output only from an antenna with less interference. Similar effects can be obtained in this case as well, in which case switch section 114 is not necessary.

The present embodiment also has a configuration in which the combination system control section controls switch section 114 to select only one received signal to be output, but it is also possible to achieve similar effects by the combination system control section controlling the weighting coefficient calculation section so that combination may be performed using only antennas with less interference, in which case switch section 114 is not necessary and it is also possible to obtain diversity gain by receiving signals through a plurality of antennas.

(Embodiment 3)

When detecting the interference mixing time, the present embodiment splits the reception slot into a plurality of slots and detects the block from which interference intrudes. Furthermore, it estimates the interference time from the interference time detection information over a plurality of past frames. When there are no reception frame errors the interference time detection information is not used for this estimation.

Figure 9:
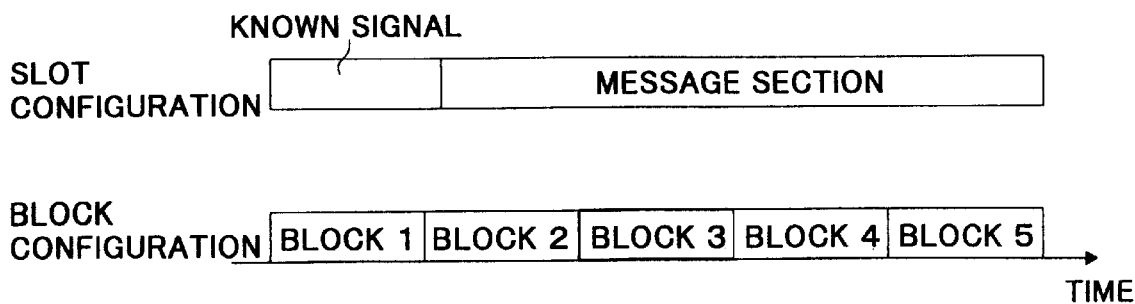
FIG. 9 is a block diagram showing the slot and block configurations in Embodiment 3 of the present invention.
Figure 10:
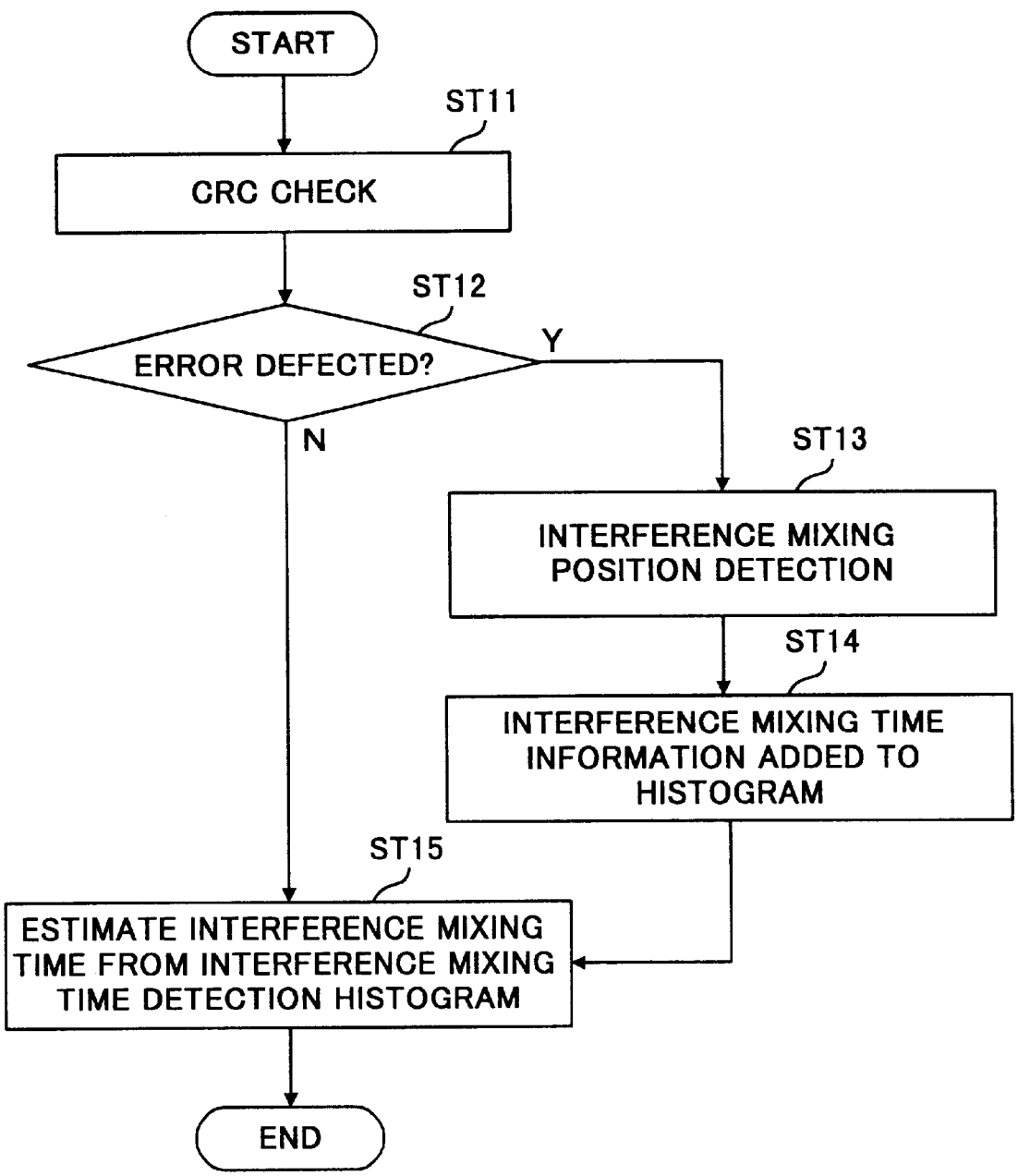
FIG. 10 is a flow chart to explain operations of the base station apparatus according to the above embodiment.
Figure 11:
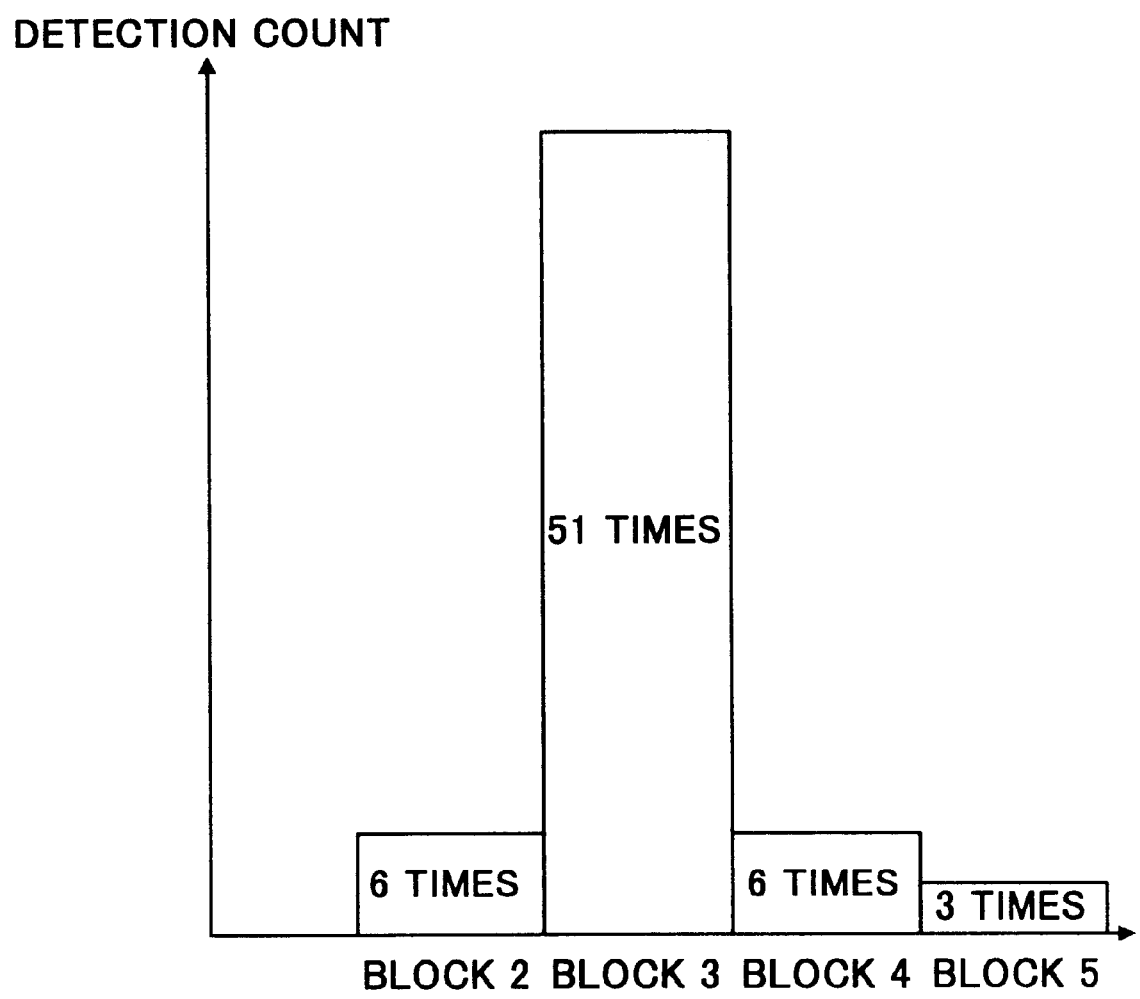
FIG. 11 is a histogram to explain operations of the base station apparatus according to the above embodiment.

FIG. 9 is a drawing to explain the slot configuration and block configuration of a received signal according to Embodiment 3 of the present invention. FIG. 10 is a flow chart to explain the operation of the interference mixing time detection section, a part of a base station apparatus according to Embodiment 3 of the present invention. FIG. 11 is a histogram to explain the operation of the interference mixing time detection section of the base station apparatus according to Embodiment 3 of the present invention.

The operation of the interference time detection section according to Embodiment 3 of the present invention is explained below using the above drawings. The basic apparatus configuration is the same as that in FIG. 2 and FIG. 3, and therefore these drawing are used for the explanation. Interference time detection section 108 time-divides the reception slot into a plurality of blocks. FIG. 9 shows a case where the reception slot is divided into 5 blocks.

If the interference signal is synchronized with the desired signal with a certain time difference, there are cases where asynchronous interference is mixed only a few times in the reception slot. The present embodiment explains an example of system in which the time at which asynchronous interference is mixed coincides with one of the 5 locations in the reception slot.

Then, with reference to the flow chart in FIG. 10, the base station apparatus in Embodiment 3 above is explained in detail below. First, in step (hereinafter referred to as "ST") 11, a CRC (Cyclic Redundancy Check) is carried out on the combined received signal. In ST12, it is judged whether the CRC has detected an error in the received signal. If some errors are detected, the interference mixing time (block position) is detected in ST13 and the detected interference mixing time information is added to the histogram in FIG. 11.

If no errors are detected in ST12, even if the interference time is detected, the detection time information is not added to the histogram in FIG. 11. The above operation is repeated over a plurality of frames.

Interference mixing time detection section 108 estimates, according to this histogram, the block in which the interference mixing start is detected most frequently in a plurality of past frames as the interference mixing time (timing). The above operation estimates the interference mixing time from the interference mixing time detection information over a plurality of past frames, which improves the detection accuracy of the interference mixing time.

Furthermore, dividing the reception frame into a plurality of blocks and making the interference mixing time as a histogram for each block ensures that the interference mixing time is detected in a system in which interference is mixed at a specific time (timing) of the reception slot. Furthermore, when there are no errors in the received signal, by not using the interference mixing time detected in the relevant slot for estimation of the interference mixing time, that is, by only using the information of the reception characteristic deteriorated by the reference signal, it is possible to improve the accuracy of detecting the interference mixing time.

(Embodiment 4)

Figure 12:
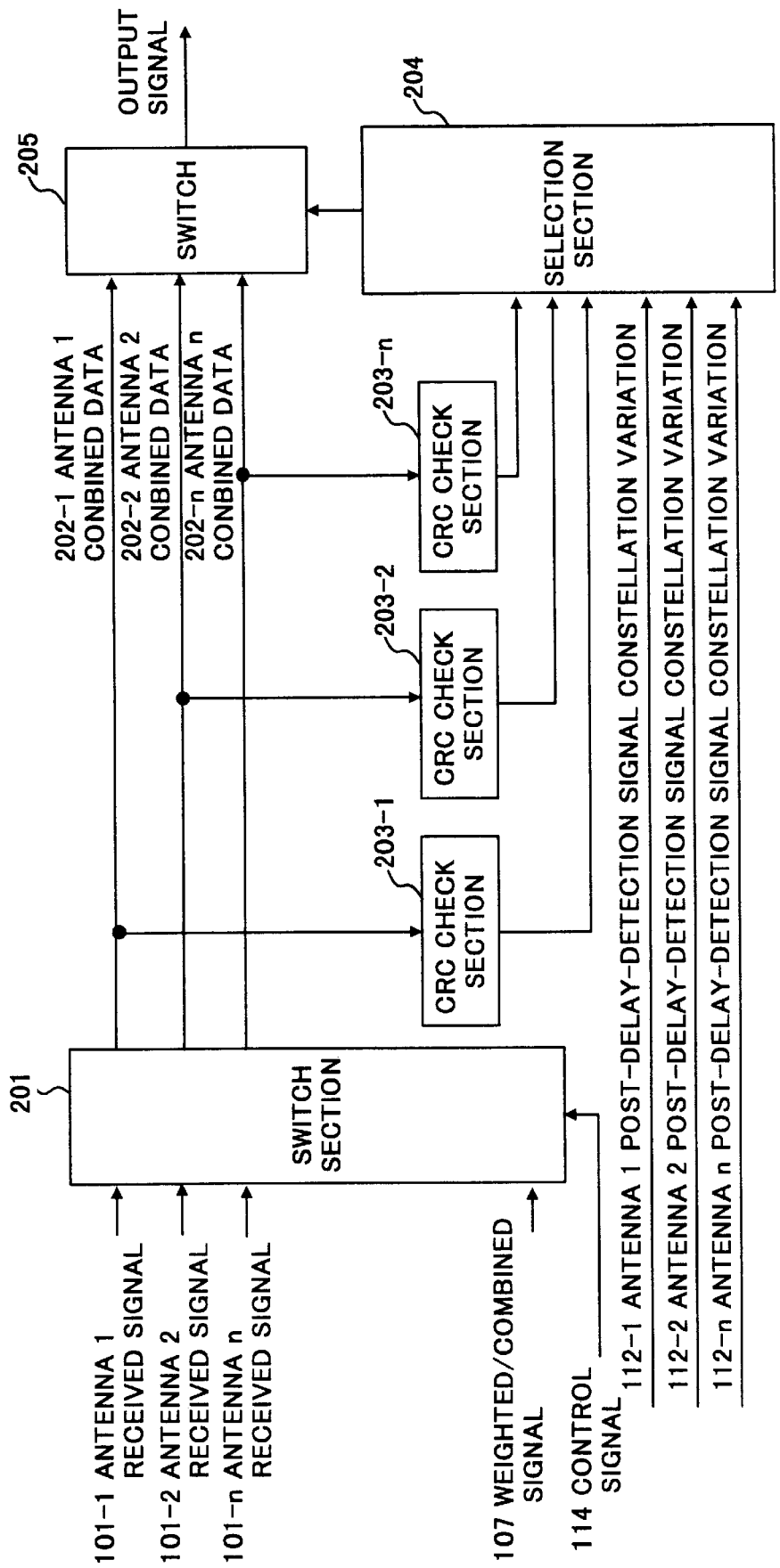
FIG. 12 is a block diagram showing the configuration of a base station apparatus according to Embodiment 4 of the present invention.
Figure 13:
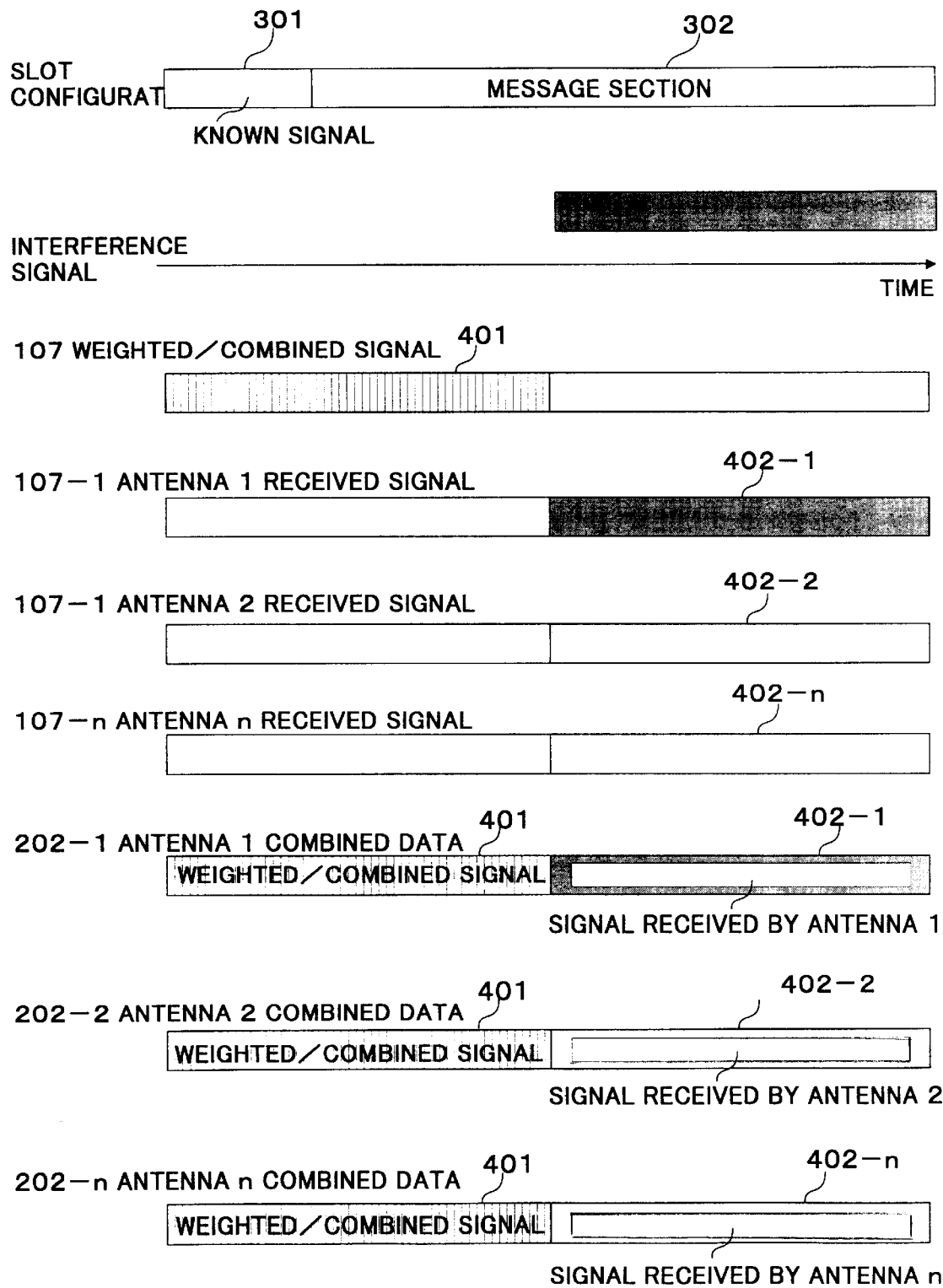
FIG. 13 is a drawing to explain generation of combined data in the above embodiment.

FIG. 12 is a block diagram showing the combination system control section of a base station apparatus according to Embodiment 4 of the present invention. FIG. 13 is a drawing to explain generation of combined data. Details are given below using these drawings. The basic configuration of the apparatus is the same as that in FIG. 2 and FIG. 3, and therefore the present embodiment is explained using the symbols in FIG. 2 and FIG. 3.

In the present embodiment, combination system control section 113 generates combined data from antenna received signals 101-1 to 101-n and combined signal 107 according to the output of interference mixing time detection section 108.

Then, generation of combined data of antenna 1 is explained. For the part without interference (non-interference part; the first half of the slot in FIG. 13), part 401 of weighted/combined signal 107 is used, and for the part with interference (interference part; the last half of the slot in FIG. 13), parts 402-1 to 402-n of signals 101-1 to 101-n received by antennas are used.

Figure 14:
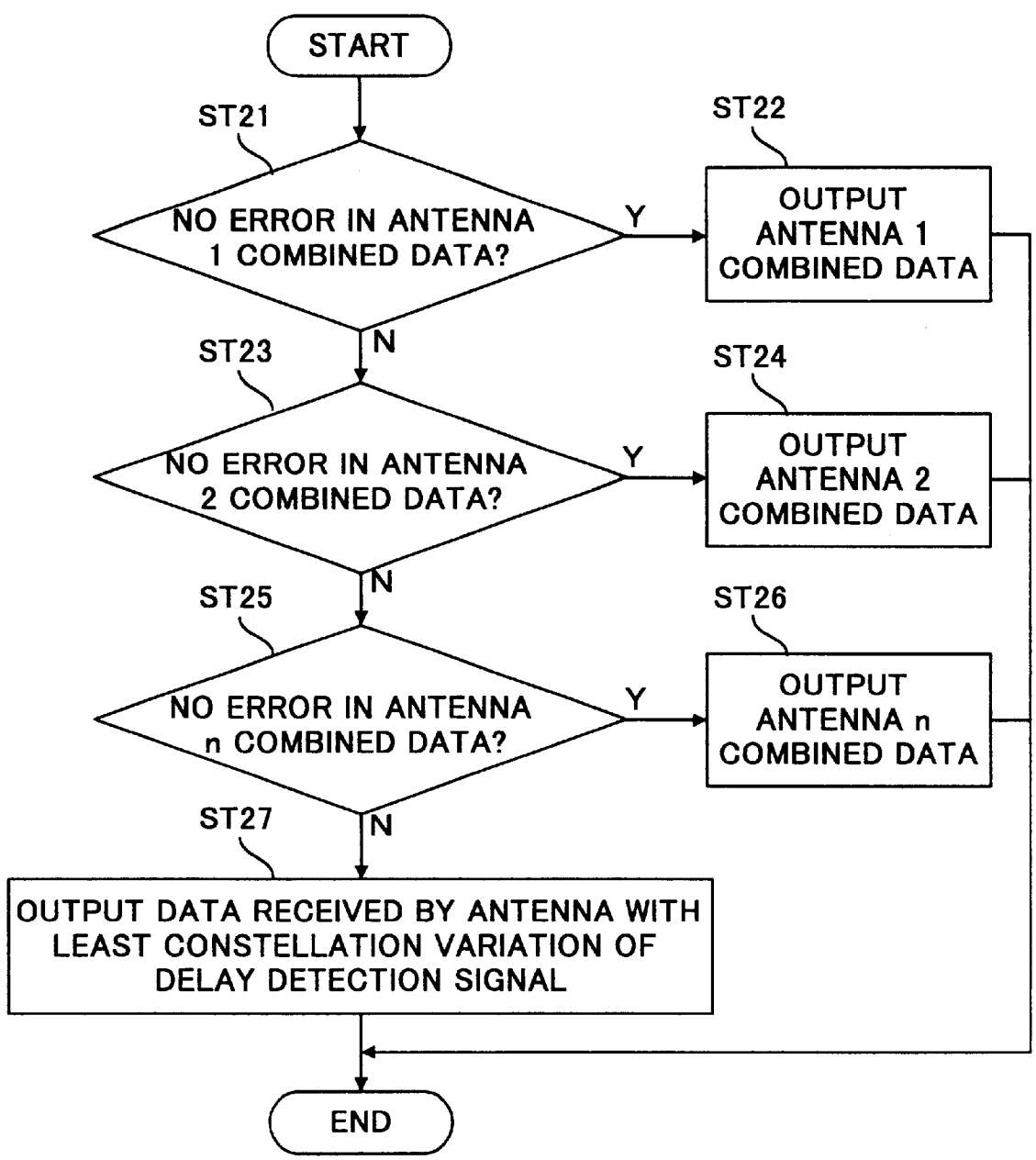
FIG. 14 is a flow chart to explain operations of the base station apparatus according to the above embodiment.

In FIG. 12, combination system control section 113 controls switch 201 as shown above and generates antenna combined data 202-1 to 202-n. Then, the operation of the combination system control section is explained with reference to the flow chart in FIG. 14.

First, in ST21, CRC section 203-1 detects errors in combined data 202-1. If there are no errors, selection section 204 selects and outputs combined data 202-1 in ST22. If errors are detected in ST21, CRC section 203-2 detects errors in combined data 202-2 in ST23. If there are no errors, selection section 204 selects and outputs combined data 202-2 in ST24. The same processing is repeated for all antennas down to antenna n (ST25, ST26). There are no special restrictions on the checking order of antennas.

If errors are discovered in all combined data 202-1 to 202-n, constellation variations 112-1 to 112-n are examined for post-delay-detection signals of the respective antennas. In this case, selection section 204 outputs the data received by the antenna with the least constellation variation of post-delay-detection signals.

When combined data 202-1 to 202-n contain data free of errors, the above operation ensures that data free of errors are output. If all combined data 202-1 to 202-n contain errors, it is possible to output combined data of the antenna with the least interference by detecting constellation variations of post-delay-detection signals. This makes it possible to improve the reception quality and drastically improve the error rate.

The present embodiment explains the base station apparatus using CRC as an error detection method, but similar effects can also be obtained by base station apparatuses using other detection methods.

Furthermore, in a system using error detection symbols that make it possible to count errors in received data, if all combined data 202-1 to 202-n contain errors, a drastic error rate improvement effect can be expected if selection section 204 selects and outputs the combined data with the least number of errors from among 202-1 to 202-n.

(Embodiment 5)

FIG. 15 is a drawing to explain the operation of the error detection section of a base station apparatus according to Embodiment 5 of the present invention. In the present embodiment, when carrying out error detection on combined signals 202-1 to 202-n through CRC calculations, CRC calculations are carried out on the part of a weighted/combined signal preceding the interference mixing time and the calculation results at that time are stored. Furthermore, when carrying out CRC calculations for each antenna, after the interference mixing time, the stored calculation results are acquired and CRC calculations resumed.

This operation is explained using FIG. 15. The following operation is performed when carrying out CRC calculations on all combined signals 202-1 to 202-n. First, for antenna 1, CRC calculations are carried out at first-half part 401 of the combined signal and the calculation results at that time are stored in a storage means such as memory. Then, for last-half part 402-1 of the combined data with interference, the stored calculation results are picked up and CRC calculations resumed.

Then for antenna 2, for first-half part 401 of the combined signal without interference, no CRC calculations are carried out and the calculation results are picked up, and for last-half part 402-1 of the combined signal with an interference signal, the stored calculation results are picked up and CRC calculations resumed. This operation is repeated for all antennas sequentially down to antenna n.

In all combined signals 202-1 to 202-n, the parts not affected by interference are commonly made up of 401, part of combined signal 107, and therefore when carrying out CRC calculations on combined signal 202-2 of each antenna, all that is required to do is to acquire the calculation results stored by combined signal 202-1 of antenna 1 and only carry out CRC calculations on last-half part 402-2.

According to the present embodiment, supposing the number of steps required for CRC calculations for the part without interference is X steps and the number of steps required for CRC calculations for the part with interference is Y steps, then CRC calculations for all antennas consist of X+Y×n steps.

On the other hand, FIG. 16 is an explanatory drawing explaining the processing when the CRC calculation results indicated in the present embodiment are not saved. In this case, CRC calculations are carried out for all combined signals 202-1 to 202-n from the start to end, and therefore CRC calculations for n antennas consist of (X+Y)×n steps.

Thus, the CRC calculation method in the present embodiment can shorten the time required for the processing of CRC calculations even when carrying out CRC calculations for n antennas, enabling high-speed processing.

The base station apparatus in the above embodiment can be applied to base station apparatuses and mobile station apparatuses in radio communication systems. Even if a plurality of base stations carrying out communications asynchronously to one another are installed, this makes it possible to eliminate interference, improve the reception performance and reduce errors.

Embodiments 1 to 5 above can be implemented with some of them combined appropriately. The present invention is not limited to Embodiments 1 to 5 above, but can be implemented with various modifications. For example, the above embodiments explain cases where the antenna least affected by an interference signal is selected, but two or more antennas with less affected by an interference signal can also be selected and output.

Thus, the present invention controls the combination system adaptively according to the time (timing) at which an interference wave is mixed with the desired signal, making it possible to improve the reception performance even if asynchronous interference is mixed and reduce errors.

The present invention is not limited to the above described embodiments, and various variations and modifications may be possible without departing from the scope of the present invention.

This application is based on the Japanese Patent Application No. HEI 10-147599 filed on May 28, 1998, entire content of which is expressly incorporated by reference herein.

What is claimed is:

1. A base station apparatus, comprising:
    timing detector which detects a timing at which an interference signal is mixed with a desired signal of signals received through a plurality of antennas; and
    selector which selects at least one antenna less affected by the interference signal from among the plurality of antennas after detection of said timing, said selector outputting the signal received through the at least one antenna.

2. The base station apparatus according to claim 1, further comprising a combination circuit which weighs signals received through the plurality of antennas and combines the received signals into a combined signal.

3. The base station apparatus according to claim 2, wherein the timing detector detects the interference signal mixing timing based on variations in an envelope of the combined signal.

4. The base station apparatus according to claim 2, wherein the timing detector detects the interference signal mixing timing based on constellation variations on an IQ plane of the combined signal.

5. The base station apparatus according to claim 1, wherein the selector selects at least one antenna less affected by the interference signal based on variations in an envelope of the received signal.

6. The base station apparatus according to claim 1, wherein the selector selects at least one antenna less affected by the interference signal based on variations in a constellation on an IQ plane of the received signal.

7. The base station apparatus according to claim 3, further comprising a delay detector which carries out delay detection processing on the signal before detection of variations in the envelope.

8. The base station apparatus according to claim 1, wherein the received signal includes frames time-divided into a plurality of blocks.

9. The base station apparatus according to claim 1, wherein the timing detector estimates the timing at which the interference signal is mixed based on the information of the interference signal mixing timing detected over a plurality of past frames of the received signal.

10. The base station according to claim 9, wherein the interference signal mixing timing information of frames without errors of the received signal is excluded when carrying out the estimation.

11. The base station apparatus according to claim 1, further comprising an error detector which detects errors of signals received through the plurality of antennas, wherein the selector selects the received signal in which the error detector has detected no errors.

12. The base station apparatus according to claim 11, wherein the error detector has calculation result storage with a CRC function for storing information in CRC calculation on the received signal before said timing and resumes calculations from the output of said calculation result storage after said timing.

13. The base station apparatus according to claim 4, further comprising a delay detector which carries out delay detection processing on the signal before detection of variations in the constellation.

14. A radio communication method, comprising:
    detecting the timing at which an interference signal is mixed with a desired signal of signals received through a plurality of antennas; and
    selecting at least one antenna less affected by the interference signal from among the plurality of antennas after detection of the timing and outputting the signal received through the at least one antenna.

15. The radio communication method according to claim 14, further comprising weighing signals received through the plurality of antennas and combining the received signals into a combined signal.

16. The radio communication method according to claim 14, wherein the timing detection detects the interference signal mixing timing based on variations in an envelope of the combined signal.

17. The radio communication method according to claim 15, wherein the timing detection detects the interference signal mixing timing based on variations in a constellation on an IQ plane of the combined signal.

18. The radio communication method according to claim 14, wherein the selection selects at least one antenna less affected by the interference signal based on variations in an envelope of the received signal.

19. The radio communication method according to claim 14, wherein the selection selects at least one antenna less affected by the interference signal based on variations in a constellation on an IQ plane of the received signal.

20. The radio communication method according to claim 16, further comprising carrying out delay detection processing on the signal before detection of variations in the envelope.

21. The radio communication method according to claim 14, wherein the timing detection estimates the timing at which the interference signal is mixed based on the information of the interference signal mixing timing detected over a plurality of past frames of the received signal.

22. The radio communication method according to claim 14, further comprising detecting errors of signals received through the plurality of antennas, wherein the selection selects the received signal in which the detection has detected no errors.

23. The radio communication method according to claim 22, wherein the error detection stores information in CRC calculation on the received signal before the timing detection and resumes calculations using the information saved after the timing detection.

24. The radio communication method according to claim 16, further comprising carrying out delay detection processing on the signal before detection of variations in constellation.

* * * * *